United States Patent
Tie et al.

(10) Patent No.: US 9,503,952 B2
(45) Date of Patent: Nov. 22, 2016

(54) SYSTEMS AND METHODS FOR INTERFERENCE CANCELLATION CAPABILITY REPORTING AND USER EQUIPMENT OFFLOADING IN HETEROGENEOUS NETWORKS

(71) Applicant: FutureWei Technologies, Inc., Plano, TX (US)

(72) Inventors: Xiaolei Tie, Shanghai (CN); Carmela Cozzo, San Diego, CA (US); Peng Zhang, Shanghai (CN); Meng Hua, Shanghai (CN); Shurong Jiao, Shanghai (CN)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 339 days.

(21) Appl. No.: 14/197,047

(22) Filed: Mar. 4, 2014

(65) Prior Publication Data

US 2014/0254559 A1    Sep. 11, 2014

Related U.S. Application Data

(60) Provisional application No. 61/775,290, filed on Mar. 8, 2013.

(51) Int. Cl.
*H04W 36/30* (2009.01)
*H04W 36/24* (2009.01)

(52) U.S. Cl.
CPC .................................. *H04W 36/24* (2013.01)

(58) Field of Classification Search
CPC ....................................................... H04W 36/24
See application file for complete search history.

(56) References Cited

U.S. PATENT DOCUMENTS

| 2007/0275722 | A1 | 11/2007 | Thorson et al. | |
|---|---|---|---|---|
| 2013/0114447 | A1 | 5/2013 | Luo et al. | |
| 2015/0055495 | A1* | 2/2015 | Kim | H04W 36/04 370/252 |

FOREIGN PATENT DOCUMENTS

| WO | 2012152633 A1 | 11/2012 | |
|---|---|---|---|
| WO | WO2013141543 A1 * | 9/2013 | H04W 24/00 |

OTHER PUBLICATIONS

U.S. Appl. No. 61/673,238, filed Jul. 18, 2012.*
U.S. Appl. No. 61/666,931, filed Jul. 2, 2012.*
U.S. Appl. No. 61/646,232, filed May 11, 2012.*
U.S. Appl. No. 61/612,388, filed Mar. 18, 2012.*
(Continued)

*Primary Examiner* — Melvin Marcelo
(74) *Attorney, Agent, or Firm* — Slater Matsil, LLP

(57) ABSTRACT

Embodiments are provided for interference cancellation (IC) capability reporting and user equipment (UE) offloading in wireless or heterogeneous networks. In an embodiment, a method performed by a UE includes reporting, to a network, IC capability information of the UE, and receiving, from the network, instructions in accordance with the IC capability information of the UE. A handover procedure is then initiated in accordance with the instructions. In another embodiment, a method performed by a network component includes receiving, from a UE, IC capability information of the UE, evaluating the IC capability information of the UE, and sending instructions to the UE in accordance with the IC capability information of the UE. The instructions determine a handover behavior by the UE.

30 Claims, 11 Drawing Sheets

(56) References Cited

OTHER PUBLICATIONS

3GPP "Interference Cancellation at the UE in Hetnets," R1-131484, 3GPP TSG-RAN WG1 Meeting #72 Chicago, USA, Apr. 15-19, 2013, 2 pages.
International Search Report received in PCT/CN2014/073058, mailed Jun. 5, 2014, 13 pages.
"3rd Generation Partnership Project; Technical Specification Group Radio Access Network; Study on UMTS Heterogenous Networks (Release 12)," 3GPP TR 25.800, V12.1.0 (Dec. 2013), Technical Report, 166 pages.
Ericsson et al., "Cell Range Expansion in Heterogeneous Networks," 3GPP TSG RAN WG1 Meeting #72, R1-130622, Agenda Item: 6.3.2, Document for: Discussion and Decision, St. Julian's, Malta, Jan. 28-Feb. 1, 2013, 6 pages.
Huawei et al., "Draft of UMTS Heterogeneous Networks Technical Report," 3GPP TSG-RAN WG1 Meeting #70bis, R1-130512, Agenda item: 6.3.3, Documents for: Discussion/Decision, St. Julian's, Malta Jan. 28-Feb. 1, 2013, 22 pages.

* cited by examiner

SYSTEMS AND METHODS FOR INTERFERENCE CANCELLATION CAPABILITY REPORTING AND USER EQUIPMENT OFFLOADING IN HETEROGENEOUS NETWORKS

This application claims the benefit of U.S. Provisional Application No. 61/775,290 filed on Mar. 8, 2013 by Xiaolei Tie et al. and entitled "Systems and Methods for Interference Cancellation Capability Reporting and User Equipment Offloading in Heterogeneous Networks," which is hereby incorporated herein by reference as if reproduced in its entirety.

TECHNICAL FIELD

The present invention relates to systems and methods for wireless communications, and, in particular embodiments, to systems and methods for interference cancellation capability reporting and user equipment offloading in heterogeneous networks.

BACKGROUND

The deployment of heterogeneous networks (Hetnets), which are mixed deployments of high power NodeBs (macro cells) and low power nodes (LPNs), aims at increasing network capacity and coverage. User equipments (UEs) are offloaded from the macro cell to the LPN and can enjoy higher data rates. The system capacity and coverage gains mainly come from more scheduling opportunities provided by the LPN. Therefore, offloading more UEs to be served by LPNs is very useful in Hetnet deployments. There is a need for efficient systems and methods for reporting UE capability such as interference cancellation (IC) capability to the network, which helps the network determine which UEs to offload to achieve better system capacity and coverage.

SUMMARY OF THE INVENTION

In accordance with an embodiment, a method implemented by a user equipment (UE) for interference cancellation (IC) capability reporting includes reporting, to a network, IC capability information of the UE, and receiving, from the network, instructions in accordance with the IC capability information of the UE. A handover procedure is then initiated in accordance with the instructions.

In accordance with another embodiment, a UE with IC capability reporting comprises at least one processor and a non-transitory computer readable storage medium storing programming for execution by the at least one processor. The programming includes instructions to report, to a network, IC capability information of the UE, receive, from the network, instructions in accordance with the IC capability information of the UE, and initiate a handover procedure in accordance with the instructions.

In accordance with another embodiment, a method implemented by a network component for supporting UE IC capability includes receiving, from a UE, IC capability information of the UE, and evaluating the IC capability information of the UE. Instructions are then sent to the UE in accordance with the IC capability information of the UE. The instructions determine a handover behavior by the UE.

In accordance with yet another embodiment, a network component for supporting UE IC capability comprises at least one processor and a non-transitory computer readable storage medium storing programming for execution by the at least one processor. The programming includes instructions to receive, from a UE, IC capability information of the UE, and evaluate the IC capability information of the UE. The network component is further configured to send, to the UE, instructions in accordance with the IC capability information of the UE. The instructions determine a handover behavior by the UE.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

In heterogeneous networks, the difference in transmit power between the macro node and the low power node (LPN) causes different coverage areas for the uplink (UL) and the downlink (DL). This is generally referred to as UL-DL imbalance. The downlink coverage is determined by the transmit power of each node, where high transmit power nodes (e.g., macro nodes) cover larger areas than low transmit power nodes (e.g., LPNs). The serving cell selection is based on the downlink received signal strength. Specifically, if a cell individual offset (CIO) of the serving cell change is configured at 0 dB, an event 1D for cell change is reported when the UE is positioned where the downlink signal received powers from the macro and LPN are the same. At that position the uplink signal received at the macro cell is substantially weaker than the signal received at the LPN, or equivalently the path loss to the macro cell is larger than the path loss to the LPN. Thus, the UE position with uplink equal path loss and the position with equal downlink received power are different and the region between such positions is referred to as the imbalance region.

Figure 1:
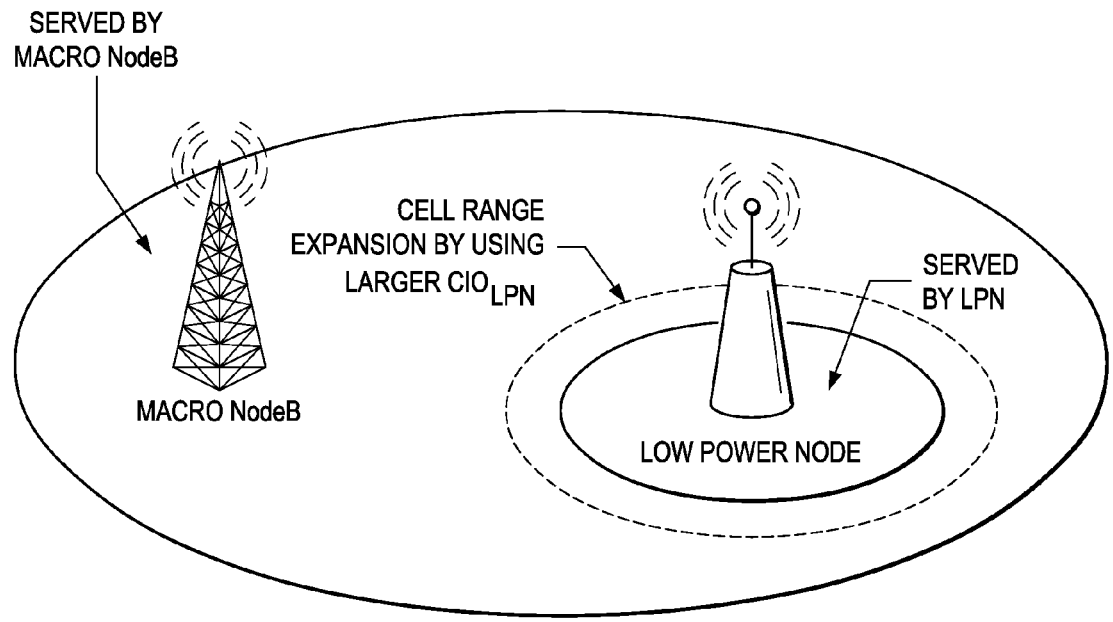
FIG. 1 illustrates a cell range expansion (CRE) scheme used in Hetnet for offloading UEs to a LPN.

CRE is a technique to expand the coverage area of the LPNs and impacts the offloading operation. With CRE, the CIO is set to a value higher than zero. Accordingly, in the area where the UE originally was served by the macro cell, the UE is offloaded to the LPN after using CRE. This area is referred to as the CRE area. To offload more UEs to be served by the LPN, one typical technique is configuring a larger handover biasing parameter. FIG. 1 illustrates a CRE scheme used in Hetnet for offloading UEs to a LPN. As defined in the $3^{rd}$ Generation Partnership Project (3GPP) specification 25.331, the serving cell change procedure is initiated by a defined event 1D. An event 1D is triggered when the following condition is satisfied for a UE:

$$10 \cdot \text{Log } M_{NotBest} + CIO_{NotBest} \geq 10 \cdot \text{Log } M_{Best} + CIO_{Best} + H_{1d}/2, \quad (1)$$

where, $M_{NotBest}$ is the measurement result of a cell which is not the serving cell of the UE, $CIO_{NotBest}$ is the cell individual offset of this specified cell, $M_{Best}$ is the measurement result of the cell which is the serving cell of the UE, $CIO_{Best}$ is the cell individual offset of a cell which is the serving cell of the UE, and $H_{1d}$ is the hysteresis parameter for the event 1d.

The CIO parameter can be configured by RRC signaling from a radio network controller (RNC) or by system information block (SIB) information from the serving NodeB. For one UE, one individual CIO is configured for one individual cell. Once the event 1D is triggered, the UE sends a measurement report which includes the measurements results to the RNC. Based on this measurement report, the RNC determines whether the UE should handover/be offloaded to a specified NotBest cell which satisfies equation (1).

According to the above serving cell change procedure, in Universal Mobile Telecommunications System (UMTS), the range expansion can be achieved by using a larger $CIO_{NotBest}$ parameter. In specific deployment scenarios of Hetnet, the network can use a larger $CIO_{LPN}$ parameter for the LPN cell. Hence, the UE located in the CRE area resulting from the applied larger $CIO_{LPN}$ parameter performs a handover (also referred to as serving cell change) to the LPN. Therefore, more UEs are offloaded to the LPN, which can improve the system capacity and coverage performance for Hetnet.

One issue that may arise when applying the CRE technique is that the offloaded UEs can have poor performance in the CRE area because of the strong interference from the macro cell. In the CRE area, the macro NodeB signal strength is larger than that of the LPN. This means that the offloaded UE can suffer from a strong interference from a macro NodeB compared with the interference when the UE is served by the macro. Therefore, the CIO parameter may not be too large. If the CIO is too large, the offloaded UEs can suffer from strong interference causing bad performance, and the control channel might not be decoded correctly. This limits the system gain of the CRE technique, and needs to be resolved in the Hetnet co-channel deployment scenarios.

The performance of the UEs in the CRE area depends on the UE capabilities. There are UEs that support IC (of some type) at the receiver, for example which can suppress or cancel neighboring cell interference. Examples of IC receivers include a type 3i receiver based on linear minimum mean squared error (LMMSE) and interference, and an advanced IC receiver based on interference signal reconstruction and cancellation. Embodiments are provided herein for IC capability reporting and UE offloading in heterogeneous networks. The embodiments include systems and methods for reporting the UE capabilities to the network, and network operations based on the UE capabilities. The embodiments also include the signaling of UE capability to perform interference cancellation, and the network behavior to offload UEs from the macro node to the LPN.

In an embodiment, a UE reports the information of its IC capability to the network. In addition to the capability to perform IC, the reported information includes information on how much performance gains can be achieved or which type of receiver is used (e.g., type 3i/IC receiver based on soft reconstruction). Based on the received IC capability from UEs, the network performs the offloading operation. The network offloads the IC capable UEs to the LPN with higher priority compared with non-IC capable UEs. The knowledge of the IC capabilities of UEs is used in the scheduling/offloading of the UEs. This scheme can be implemented in heterogeneous networks, such as UMTS Hetnets, Long Term Evolution (LTE) Hetnets, and the like, by suitable devices, such as macro nodes, LPNs, UEs, and the like.

Figure 2:
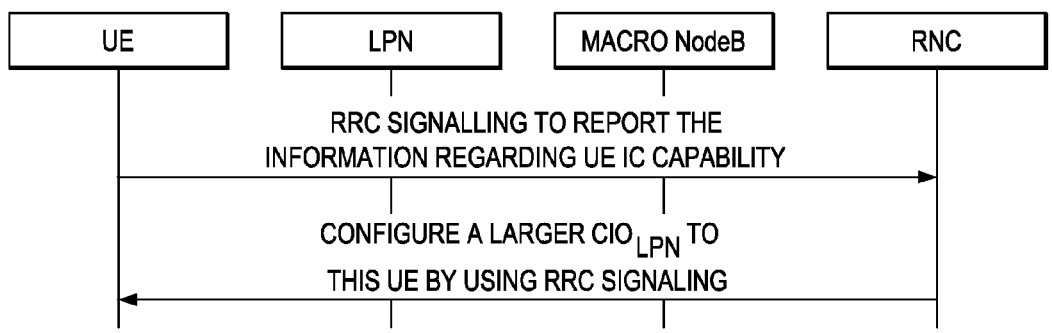
FIG. 2 illustrates an embodiment method for radio resource control (RRC) signaling to report IC capability, RRC signaling for cell individual offset (CIO) reconfiguration.

In an embodiment, the UE reports to the network are provided via RRC signaling. RRC signaling can also be used by the network for CIO reconfiguration at the UEs. FIG. 2 shows an embodiment method for RRC signaling to report IC capability, with RRC signaling for offloading. Accordingly, a UE uses RRC signaling to report the information regarding its IC capability to the RNC. Based on this information for IC capability, the RNC can offload this UE to the LPN directly, or assign a higher priority for this UE to be offloaded to LPN.

To report the IC capability information, the RRC signaling can contain a new defined information element (IE) to indicate IC capability information of the UE. When the RNC receives the RRC signaling which contains an IC capability IE, the RNC determines if the reported information regarding IC capability shows that the UE supports interference cancellation. If this is true, then the RNC can use RRC signaling to set a larger CIO parameter for a target LPN compared with that of non-IC UEs. As such, the UE is more likely to be offloaded to the LPN compared with non-IC UEs.

The IC capability information can include an indication of whether the UE can support IC receiver. The IC capability information can also include an indication of which class of IC capability the UE supports. The different IC capability classes can be defined according to which kind of IC receiver algorithm is used. For example, the types of IC receivers include type 3i receivers (e.g., as defined in 3GPP technical specification 25), IC receivers which can only reconstruct and cancel the control channel signal from the received signal, IC receivers which can reconstruct and cancel both the control and data signal from the received signal, IC receivers which can only cancel the strongest interference signal, and/or IC receivers which can cancel several (N) interference signals.

The different IC capability classes can also be defined according to whether the UE needs the network assistance to perform IC. This can include indicating no need for network assistance to perform IC, where the UE can blindly detect the necessary information to do interference reconstruction and cancellation. This can also include indicating the need for partial information through network assistance to perform IC. In this case, the UE may need the network to indicate some partial information of the interference signal. An example of the partial information is the modulation type and used channelization codes. This can also include indicating the need for all information through network assistance to perform IC. In this case, the UE may need the network to indicate the exact information of the interference signal. For example, for interference caused by the high speed-physical downlink shared channel (HS-PDSCH) data, the needed information is all the information included in the corresponding high speed-shared control channel (HS-SCCH), such as transport block size (TBS), modulation type, codes set and pre-coding indicator (PCI), and/or other relevant information. The different IC capability classes can also be defined according to the supported minimum signal-to-interference-plus-noise ratios (SINRs) for decoding different specified data sizes with designated block error rate (BLER) target.

If the reported information regarding to IC capability indicates which class of IC capability the UE supports, then the network can use RRC signaling to set different $CIO_{LPN}$ parameters for UEs with different IC capability classes. As such, substantially larger $CIO_{LPN}$ values can be assigned for UEs with more powerful IC capability. Thus, a UE with more powerful IC capability has a higher possibility to be offloaded from the macro NodeB to the LPN.

Figure 3:
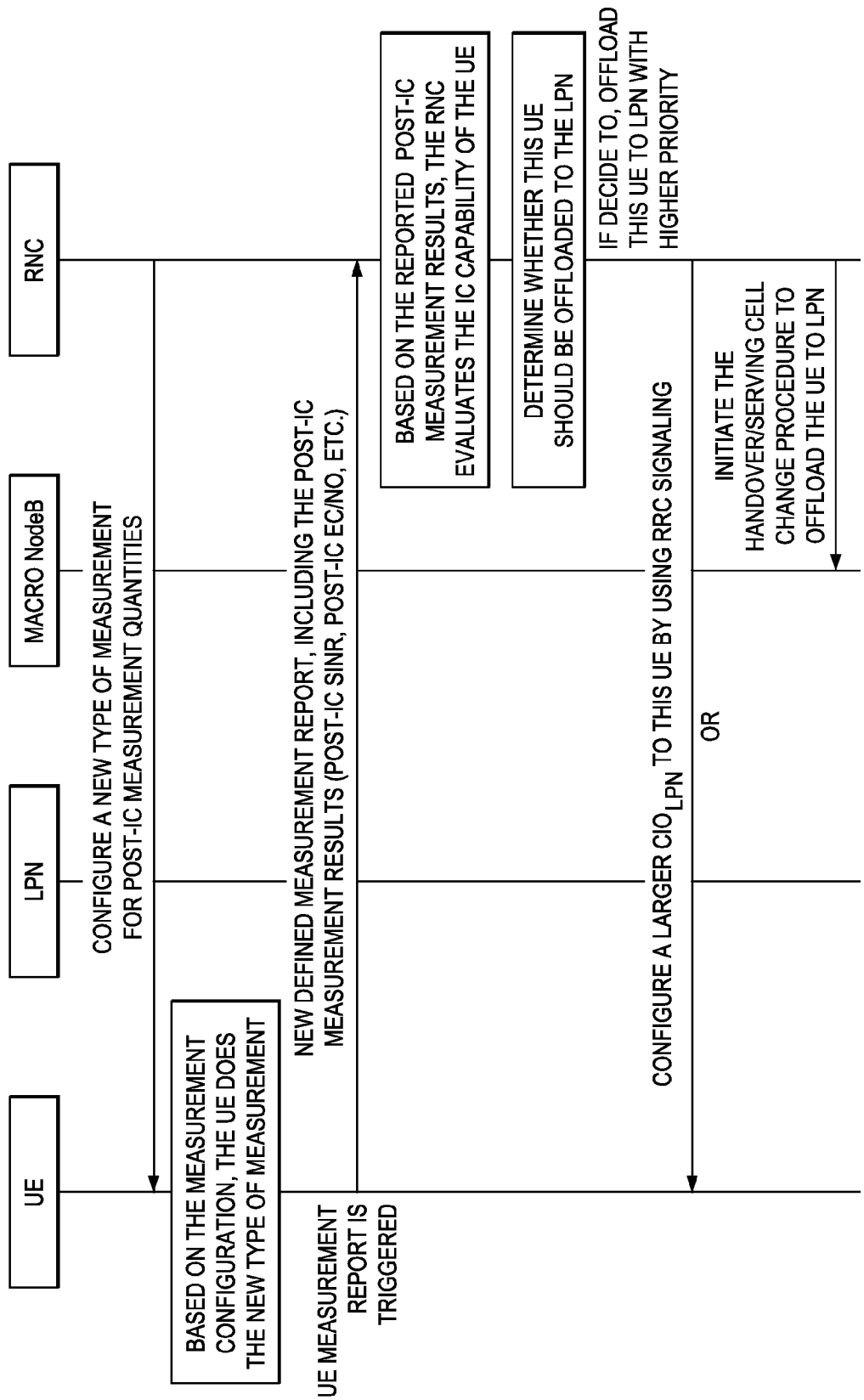
FIG. 3 illustrates an embodiment method for interference cancellation (IC) capability evaluation by measurements reporting, with RRC based offloading.

In an embodiment, a new measurement is provided for UE IC capability reporting and RRC signaling for CIO reconfiguration. FIG. 3 shows an embodiment method for IC capability evaluation by measurements reporting, with RRC based offloading. The UE uses the RRC signaling to report the information regarding its IC capability. The RRC signaling comprises a new defined measurement report that contains measurement results for post-IC measurement quantities (denoted by the notation $M_{post-IC}$). Based on this new defined measurement report, the RNC evaluates the IC capability of the UE and determines whether the UE should be offloaded to the LPN.

Examples of post-IC measurement quantities in the new measurement report include post-IC SINR, post-IC CQI, post-IC Ec/No (received energy per chip divided by the power density in the band), and/or other suitable measurement quantities. In addition to the post-IC measurement quantities, the new measurement report can optionally contain measurement results for corresponding pre-IC measurement quantities (denoted by the notation $M_{pre-IC}$) Examples of the corresponding pre-IC measurement quantities include pre-IC SINR, pre-IC CQI, pre-IC Ec/No, and/or other suitable measurements. The new defined measurement report can be configured by the RNC. When the RNC receives the new defined measurement report, the RNC extracts the measurement results for the new defined post-IC measurement quantities $M_{post-IC}$. According to the measurement results for $M_{post-IC}$, the RNC evaluates the IC capability of the UE and then, based on the evaluation results, determines whether this UE should be offload to the LPN with higher priority, or directly offloads this UE to the LPN.

In embodiment for evaluating the IC capability, the network checks if $|M_{post-IC, serving} - M_{pre-IC, serving}| > Threshold1$, or $|M_{post-IC, serving} - M_{pre-IC, serving}|/M_{pre-IC, serving} > Threshold2$, where $M_{post-IC, serving}$ represents the results of $M_{post-IC}$ for the serving cell, $M_{pre-IC, serving}$ represents the results of $M_{pre-IC}$ for the serving cell, and Threshold1 and Threshold 2 are defined thresholds. If the condition above is satisfied, the RNC can conclude that the UE has some ability to perform IC. The RNC can also evaluate how powerful the IC capability of the UE is according to the relations above. For example, the larger the inequalities above are, the more powerful the IC capability is. Based on this evaluation, the RNC assigns higher offload priority to UEs with more power IC capability. The network can assign a UE with higher priority to be offloaded to a LPN by configuring a larger $CIO_{LPN}$ to this UE for the offloading target LPN, or by directly initiating the serving cell change procedure to offload this UE to the target LPN.

In an embodiment to determine whether a UE should be offloaded to a LPN based on the measurement results for $M_{post-IC}$, the network determines if the serving cell is not the LPN, and if $|M_{post-IC, serving} - M_{post-IC, LPN}| < Threshold3$ or $|M_{post-IC, serving} - M_{post-IC, LPN}|/M_{post-IC, serving} < Threshold4$, where $M_{post-IC, LPN}$ represents the results of $M_{post-IC}$ for the LPN cell, $M_{post-IC, serving}$ represents the results of $M_{post-IC}$ for the serving cell, and Threshold3 and Threshold4 are defined thresholds. If the condition above is satisfied, then the RNC can conclude that the UE should be offload to the LPN. The smaller the values for Threshold3 or Threshold4 are, the higher offload priority the UE has. Alternatively, if the post-IC measurements results for the LPN are larger than a defined threshold (e.g., if $M_{post-IC, LPN} > Threshold5$), then the RNC can conclude that this UE should be offloaded to the LPN. To assign a UE with higher priority to be offloaded to a LPN, the network configures a larger $CIO_{LPN}$ value to this UE for the offloading target LPN. Alternatively, the network directly initiates the serving cell change procedure to offload this UE to the target LPN.

Figure 4:
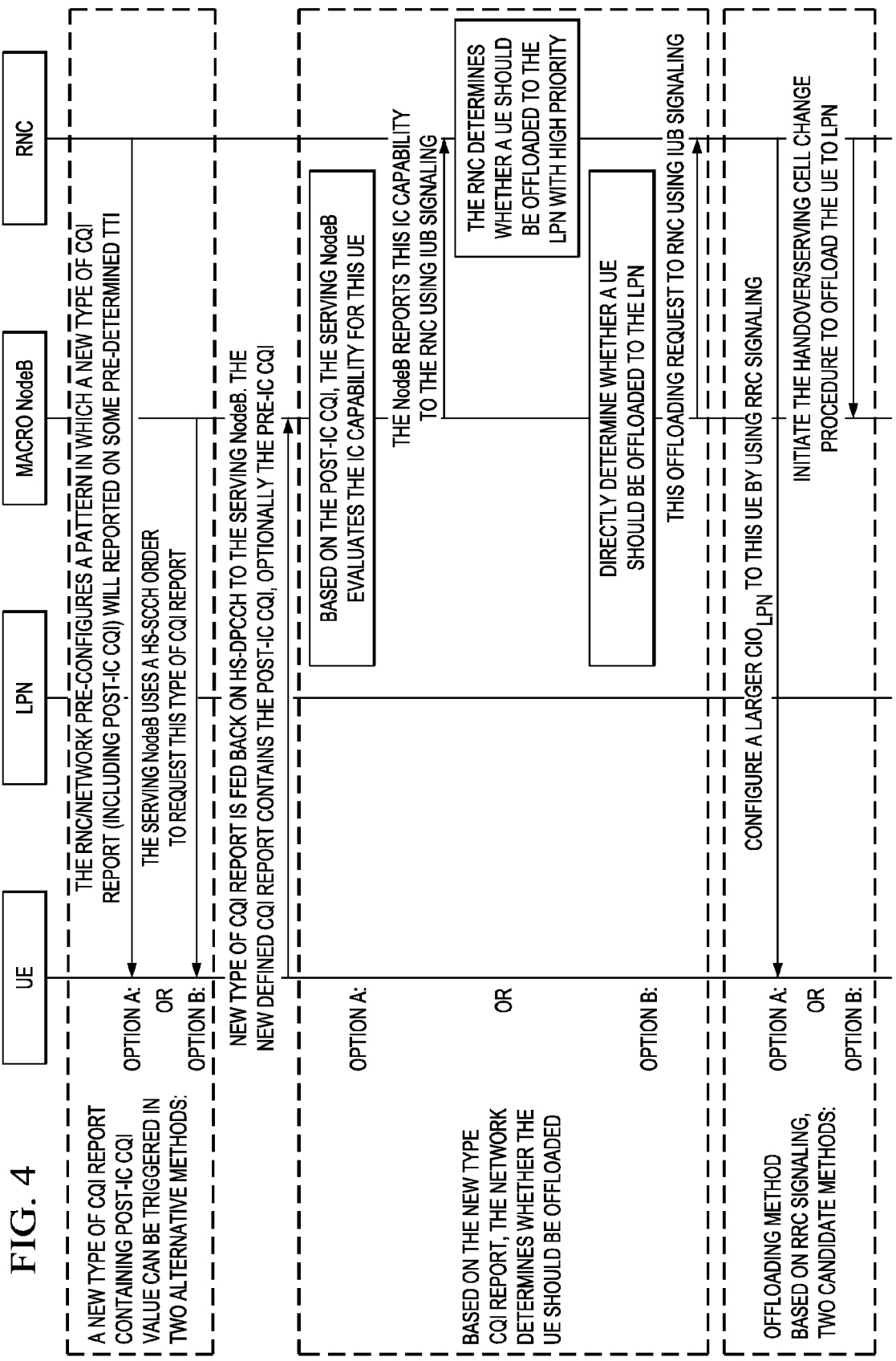
FIG. 4 illustrates an embodiment method for using channel quality indicator (CQI) to inform the IC capability, with RRC based offloading.
Figure 5:
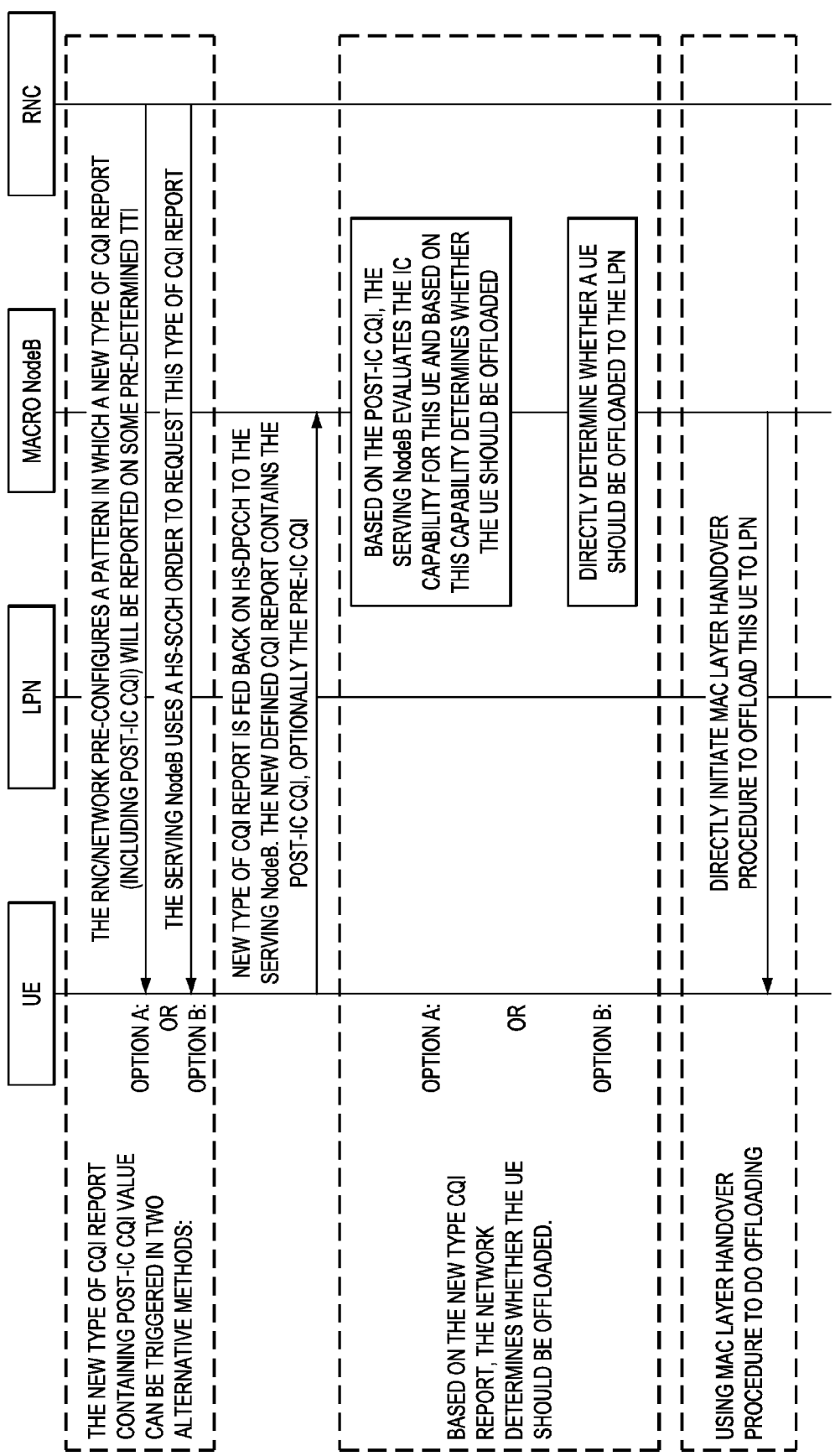
FIG. 5 illustrates an embodiment method for using CQI to inform the IC capability, with media access control (MAC) layer based offloading.

In an embodiment, UE IC reporting is provided by signaling the CQI difference, and accordingly, the UE is offloaded to the LPN. FIG. 4 shows an embodiment method for using CQI to inform the IC capability, with RRC based offloading. FIG. 5 shows an alternative embodiment method for using CQI to inform the IC capability, with MAC layer based offloading. In the two embodiments, the UE uses a new type of CQI report to indicate the information regarding its IC capability to the serving NodeB. The new type of CQI report contains the post-IC CQI (CQI value considering IC) value and optionally a pre-IC CQI (CQI value not considering IC) value. When receiving this new type of CQI report, the serving NodeB evaluates the IC capability of this UE based on the contained post-IC CQI and/or pre-IC CQI. Alternatively, the serving NodeB directly determines whether a UE should be offloaded from the macro NodeB to the LPN.

The pre-IC CQI and post-IC CQI can be contained in the new type of CQI report at the same time in one transmission time interval (TTI) on a feedback control channel, e.g., a high-speed-dedicated physical control channel (HS-DP-CCH). Alternatively, the pre-IC CQI and post-IC CQI can be fed back using time-division multiplexing according to a preconfigured pattern in which some TTIs are configured to convey pre-IC CQI and other TTIs are configured to convey the post-IC CQI. In yet another implementation, the pre-IC CQI and post-IC CQI can be fed back using code-division multiplexing. In an embodiment, the reported new type of CQI report can contain the post-IC CQI for a current serving cell and/or post-IC CQI for a neighboring cell. The new type CQI report can also include the pre-IC CQI for the current serving cell and/or pre-IC CQI for the neighboring cell.

To trigger the reporting for the new type of CQI report, the serving NodeB can use a HS-SCCH command to request this type of CQI report. Alternatively, the RNC/network preconfigures a pattern in which this new type of CQI report is reported on a predetermined TTI on feedback channel (e.g., HS-DPCCH).

With respect to the network offloading operation, when receiving the new type of CQI report, the serving NodeB extracts the post-IC CQI value. Based on the post-IC CQI value and the pre-IC CQI value extracted from this or some other CQI report, the serving NodeB evaluates the IC capability for this UE or directly determines whether this UE should be offloaded to the LPN. In an embodiment to evaluate the IC capability for the UE based on the post-IC CQI value and the pre-IC CQI value, the network checks if $|CQI_{post-IC, serving} - CQI_{pre-IC, serving}| >$ Threshold1 or $|CQI_{post-IC, serving} - CQI_{pre-IC, serving}|/CQI_{pre-IC, serving} >$ Threshold2, where $CQI_{post-IC, serving}$ represents the value of $CQI_{post-IC}$ for the serving cell, $CQI_{pre-IC, serving}$ represents the value of $CQI_{pre-IC}$ for the serving cell, and Threshold1 and Threshold2 are defined thresholds. If the condition above is true, the serving NodeB can conclude that the UE has some ability to perform IC. The serving NodeB can also evaluate how powerful the IC capability of the UE is.

In an embodiment offloading procedure, after the serving NodeB evaluates the IC capability of the UE, the NodeB reports this IC capability to the RNC using Iub signaling. Based on this information, if the serving NodeB of the UE is a macro NodeB, the RNC can determine whether this UE should be offloaded to the LPN with high priority. Higher offload priority can be assigned to UEs with more powerful IC capability. As shown in FIG. 4, to offload a UE with higher priority to the LPN, the RNC sets a larger $CIO_{LPN\ value}$ to this UE for the offloading target LPN, or alternatively directly initiates the serving cell change procedure to offload this UE to the target LPN.

In an embodiment method for using the post-IC CQI value to determine whether the UE should be offload to the LPN, the network determines if the serving cell is not the LPN, and if $|CQI_{post-IC, serving} - CQI_{post-IC, LPN}| <$ Threshold3 or $|CQI_{post-IC, serving} - CQI_{post-IC, LPN}|/CQI_{post-IC, serving} <$ Threshold4, where $CQI_{post-IC, LPN}$ represents the value of $CQI_{post-IC}$ for the LPN cell, $CQI_{post-IC, serving}$ represents the value of $CQI_{post-IC}$ for the serving cell, and Threshold3 and Threshold4 are defined thresholds. If the condition above is satisfied, the serving NodeB can conclude that the UE should be offloaded to the LPN. The smaller the value of Threshold3 or Threshold4 is, the higher the priority to offload the UE is. Alternatively, if the post-IC CQI value for the LPN is larger than a specified threshold (e.g., if $CQI_{post-IC, LPN} >$ Threshold5), then the serving NodeB can conclude that this UE should be offloaded to the LPN.

In an embodiment offloading option, after the serving NodeB directly determines that a UE should be offloaded to the LPN, the serving NodeB reports this offloading request to the RNC using Iub signaling. After receiving this request, the RNC initiates the serving cell change procedure to offload this UE to the LPN. In another offloading option, as shown in FIG. 5, after the serving NodeB directly determines a UE should be offloaded to the LPN, the serving NodeB can directly initiate a MAC layer handover procedure to offload this UE to LPN. This MAC layer handover procedure is suitable for Hetnet scenarios, in which several LPNs are deployed inside the coverage of the macro cell with the purpose of increasing network capacity. The LPN has small coverage which causes more handovers than legacy homogeneous network. In this case, if the MAC layer handover mechanism is introduced, some handover/offloading procedure/functions can move from the RNC to NodeB. This can introduce a faster offloading/handover. The handover signaling and processing burden is also reduced on the RNC.

Figure 6:
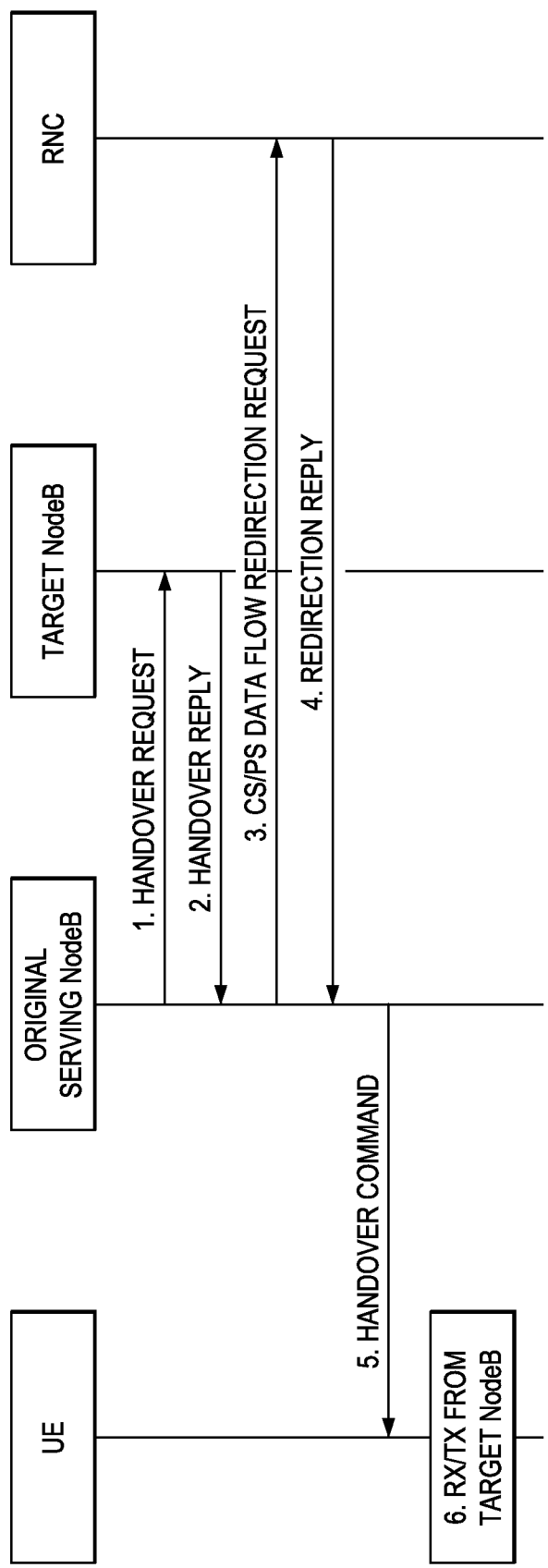
FIG. 6 illustrates an embodiment MAC layer handover procedure for a non-combined cell case.

The MAC layer handover mechanism relies on the architecture or relationship between the macro NodeB and LPNs. There are two cases: a non-combined cell case and a combined cell case. In the non-combined cell case, the LPNs deployed within the macro NodeB coverage do not use the same scrambling code as that of the macro NodeB, if the serving NodeB decides to offload/handover the UE to another NodeB. FIG. 6 shows an embodiment MAC layer handover procedure for the non-combined cell case. First, the serving NodeB sends a signaling conveying a handover request primitive to the target NodeB. If the target NodeB has the resource to serve the UE, it acknowledges the handover request by a handover reply primitive conveyed by a signaling to the serving NodeB. If the target NodeB acknowledges the handover request, then the serving NodeB sends a circuit switched (CS) or packet switched (PS) data flow redirection request primitive to the RNC to ask the RNC to redirect the data flow for UE to the target NodeB. If the RNC agrees with the redirection request, it acknowledges this request by a redirection a reply primitive over an Iub signaling. The serving NodeB then issues a handover command primitive to the UE to command the UE to start using the target NodeB to receive and transmit data. The handover command could be a MAC layer signaling or physical layer signaling (such as a HS-SCCH command).

Figure 7:
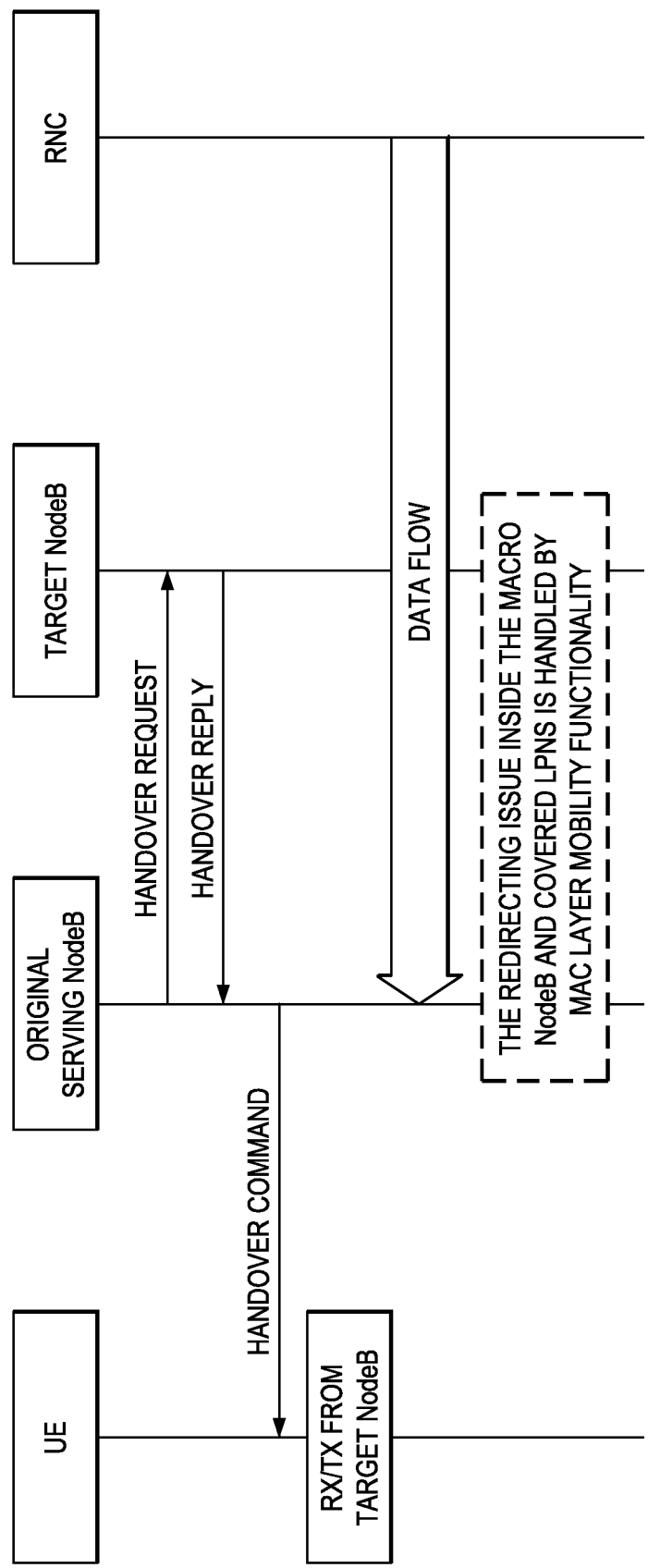
FIG. 7 illustrates another embodiment MAC layer handover procedure for the non-combined cell case.

As a variation of the above MAC layer handover procedure, the steps for the redirection request and redirection reply can be omitted or made optional in some cases. FIG. 7 shows another embodiment MAC layer handover procedure for the non-combined cell case. In this case even where the scrambling codes for the NodeBs are different, the cell ID for the serving cell and the target cell could be configured the same. For redirecting the data, the serving cell and target cell look the same from the RNC point of view. The RNC forwards/directs the UE data to the macro NodeB, and the macro NodeB sends the data to the UE's serving Node based on the information on the MAC layer.

Figure 8:
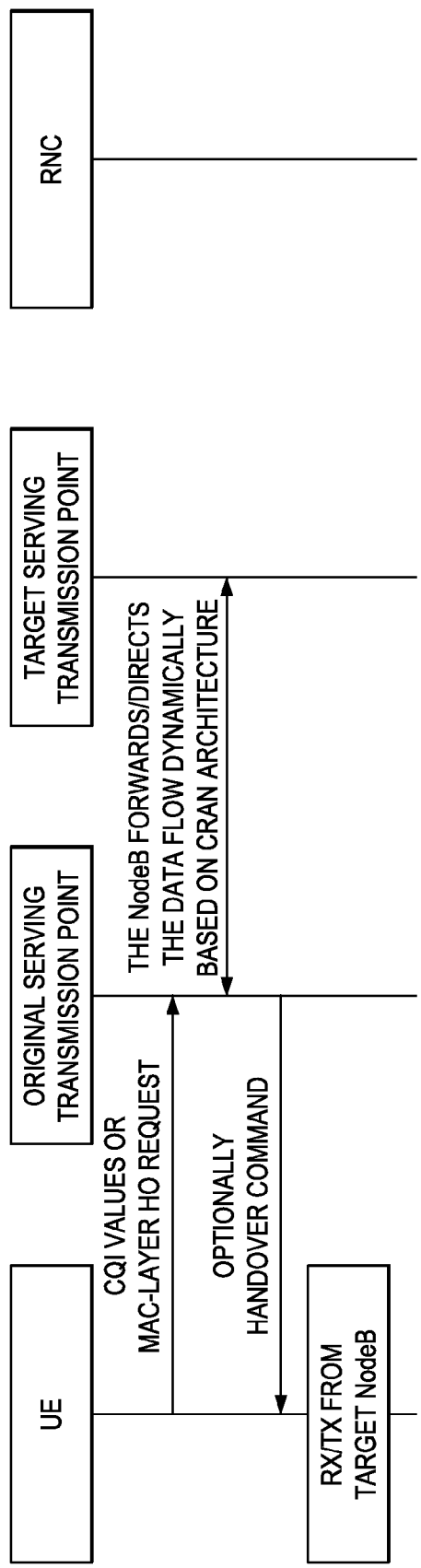
FIG. 8 illustrates an embodiment MAC layer handover procedure for a combined cell case.

For combined cell deployments, the LPN deployed within the coverage area of a macro NodeB uses the same scrambling code as that of the macro NodeB. In this case, there is a central scheduler or offloading functionality on the macro NodeB. FIG. 8 shows an embodiment MAC layer handover procedure for the combined cell case. In this procedure, the central scheduler or offloading functionality, based on the CQIs reported by the UE, dynamically directs the data flow to the best transmission point. The corresponding transmission point can receive/transmit data from/to the UE. Optionally, a handover command is used to indicate the currently used transmission point to the UE.

Figure 9:
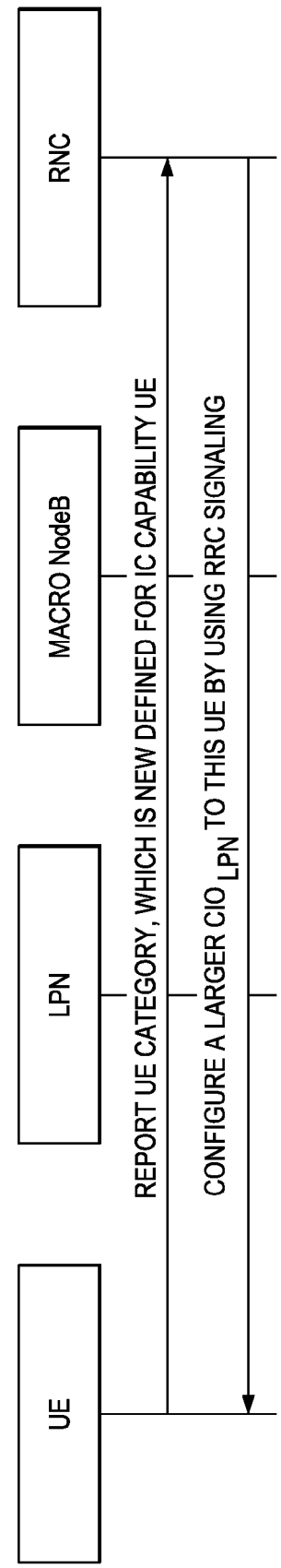
FIG. 9 illustrates an embodiment method for UE category reporting to inform the IC capability, with RRC signaling for CIO reconfiguration.

FIG. 9 shows an embodiment method for UE category reporting to inform the IC capability, with RRC signaling for CIO reconfiguration. New UE categories are introduced and defined according to the IC capability of the UE. When the RNC receives the RRC signaling conveying the UE category information, the RNC can obtain the knowledge of how powerful is the IC capability of the UE. Based on this information, the RNC can determine whether a UE should be offloaded to the LPN. Several UE categories could be introduced and defined.

For instance, the UE categories are according to IC receiver types. The IC receiver types may include the type 3i receiver, the IC receiver which can only reconstruct and cancel the control channel signal from the received signal, the IC receiver which can reconstruct and cancel both the control and data signal from the received signal, the IC receiver which can only cancel the most strongest interference signal, and/or the IC receiver which can cancel several (N) interference signals. The UE categories can be according to UE IC capability classes. The UE IC capability classes may include not needing network assistance to perform IC, where the UE can blindly detect the necessary information to do interference reconstruction and cancellation. Another IC capability class may need partial information through network assistance to perform IC. In this case, the UE needs the network to indicate some partial information of the interference signal. An example of the partial information is the modulation type and used channelization codes. Another IC capability class may need all information through network assistance to perform IC. In this case, the UE needs the network to indicate the exact information of the interference signal. For the interference caused by the HS-PDSCH data, an example of the all information is all information included in the corresponding HS-SCCH, such as TBS, modulation type, codes set and PCI, or other relevant information. Other IC capability class definitions can also be used, such as based on the supported minimum SINR for decoding a specified TBS with specified BLER target.

In an embodiment, when the RNC receives the UE category and based on this information obtains knowledge of how powerful is the IC capability, the RNC configures different $CIO_{LPN}$ parameters for different IC capability classes. For more powerful IC capability, larger the $CIO_{LPN}$ parameters are configured through RRC signaling, which means that the UE has higher probability to be offloaded to LPN.

Figure 10:
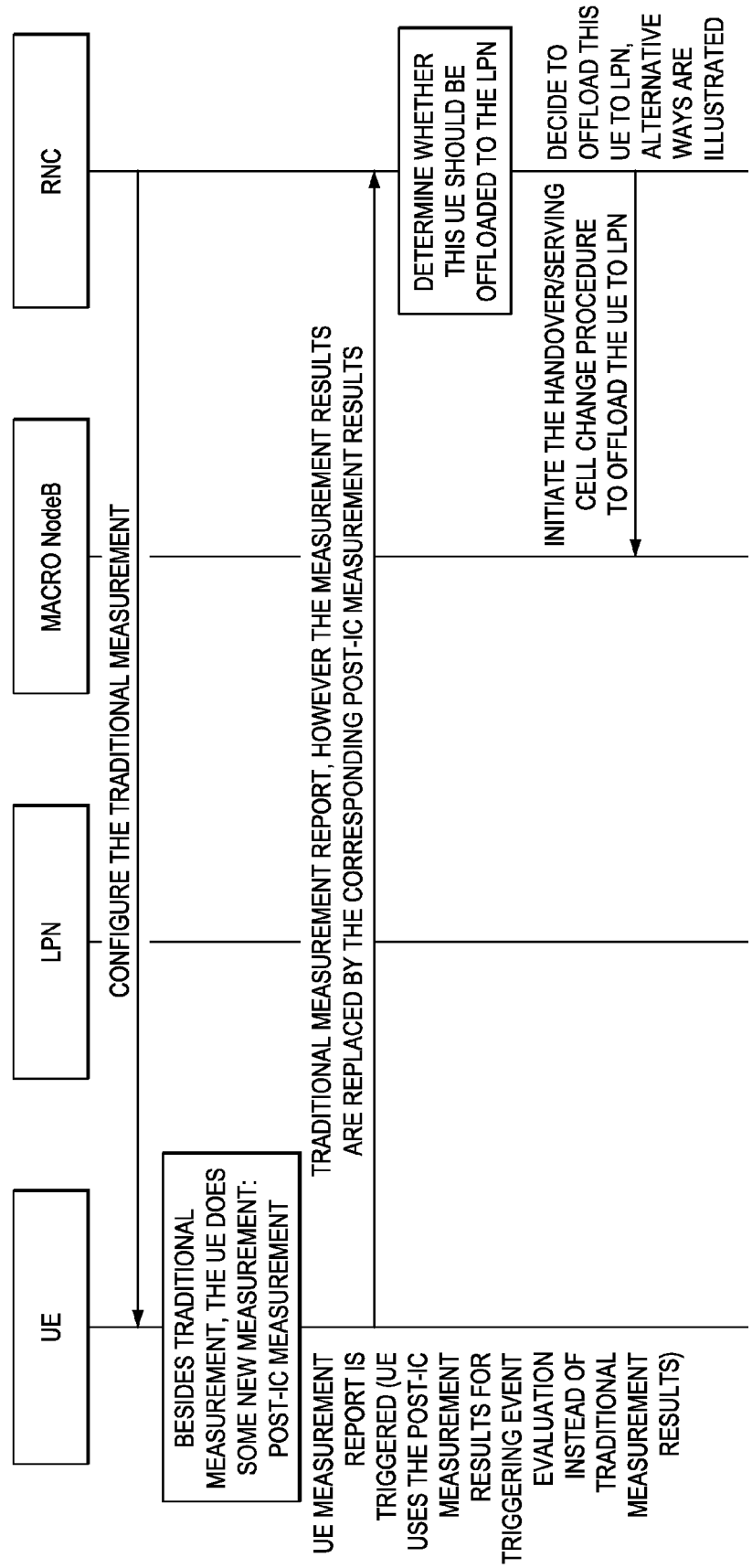
FIG. 10 illustrates an embodiment method for using post-IC measurement results for event triggering.

FIG. 10 shows an embodiment method for using post-IC measurement results for event triggering. A traditional measurement for handover triggering (such as event 1A or 1D) is configured by the RNC using legacy RRC signaling. The UE can perform the measurement as specified by current specification except that the UE performs the post-IC measurement instead of pre-IC measurement. The UE uses the post-IC measurement quantities to do event triggering instead of the traditional pre-IC measurement quantities. In the measurement report, the post-IC measurement results for measurement quantities are also reported instead of measurement results of the traditional pre-IC measurement quantities. This can allow the IC capable UE to trigger the measurement report early and cause the IC capable UE to have higher probability for handover to the LPN. For the same setting of $CIO_{LPN}$, a more powerful IC capability UE has a higher probability to be offloaded to the LPN.

In an embodiment, UE IC capability reporting is provided by a specified CQI value, and hence the network offloads the UE to the LPN. The UE uses a specified or special (non-used) CQI value to report the information regarding its IC capability to the serving NodeB. When receiving this special CQI value, the serving NodeB acquires the knowledge that the UE is capable of interference cancellation. Based on this information, the network can determine whether a UE should be offloaded from the macro NodeB to the LPN. To trigger the reporting of the special CQI-value, the serving NodeB can use a HS-SCCH order to request this indication. Alternatively, the RNC/network preconfigures a pattern in which this IC capability indication is reported on a predetermined TTI on feedback channel (e.g., on HS-DPCCH).

Figure 11:
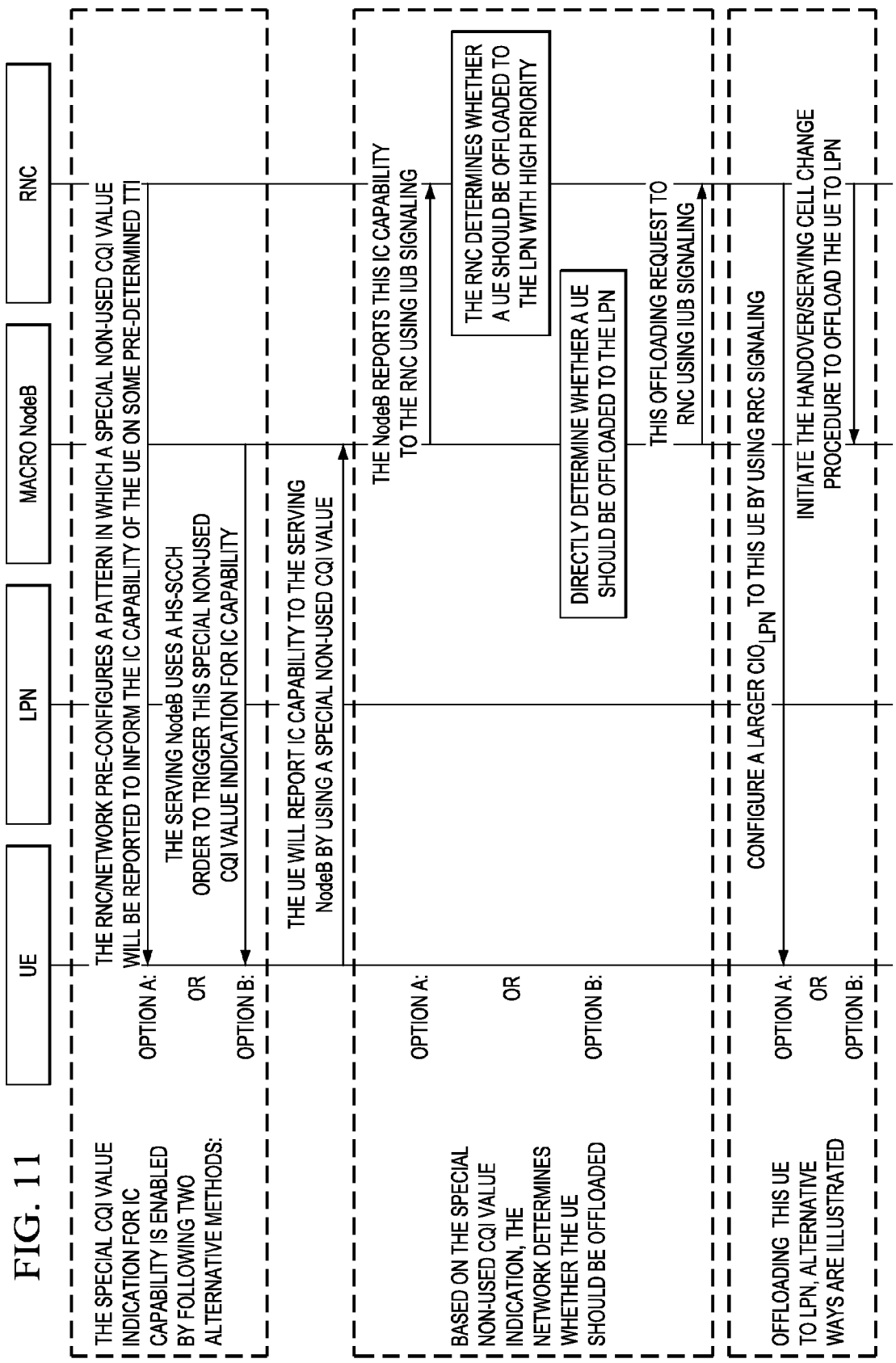
FIG. 11 illustrates an embodiment of IC capability reporting by a specified CQI value, with RRC based offloading.

FIG. 11 shows an embodiment of IC capability reporting by a specified CQI value, with RRC based offloading. The serving NodeB reports this IC capability to the RNC using Iub signaling. Based on this information, if the serving NodeB of this UE is a macro NodeB, the RNC configures a larger $CIO_{LPN}$ to this UE for the offloading target LPN, or directly initiates the serving cell change procedure to offload this UE to the target LPN.

Figure 12:
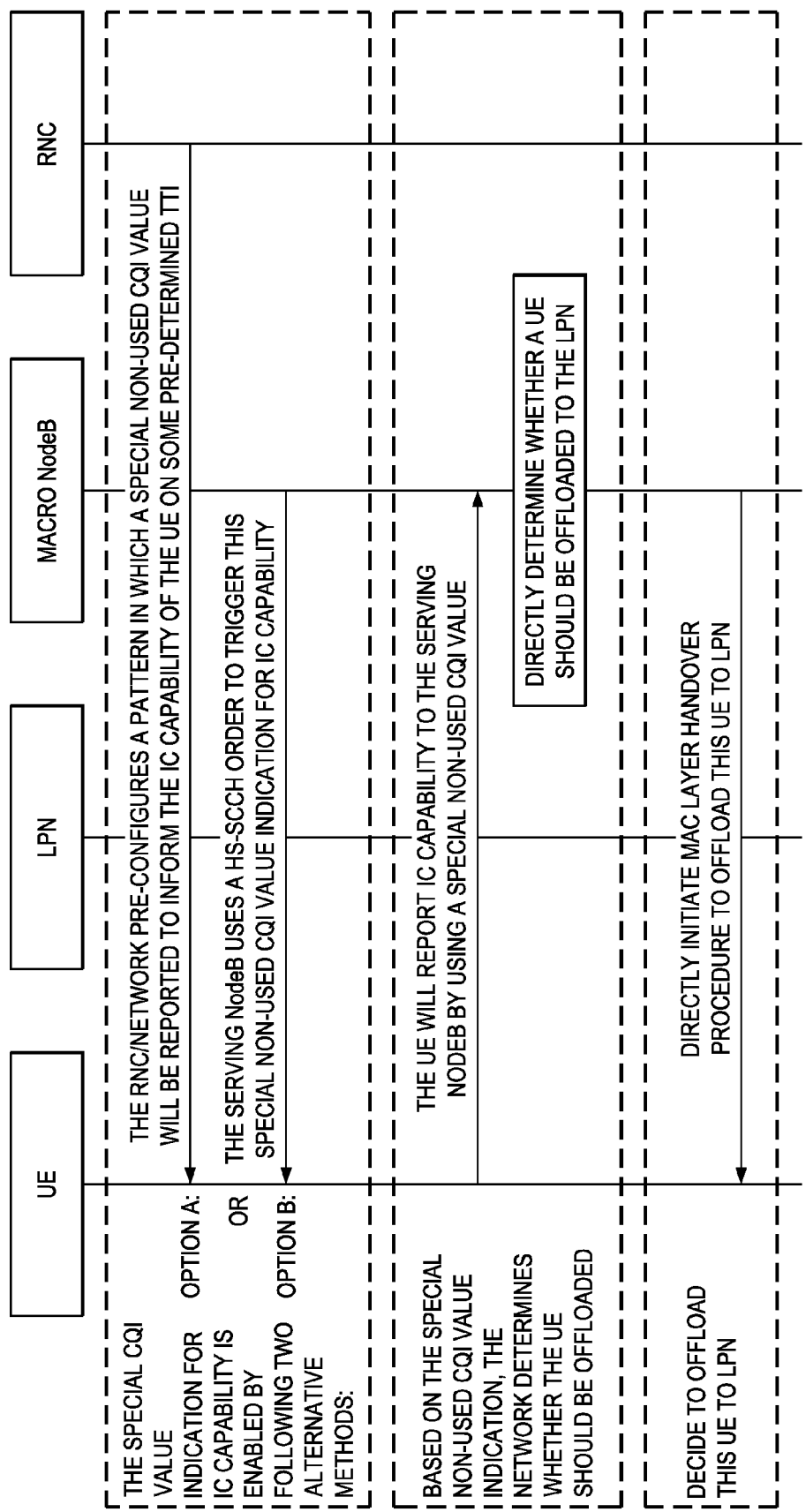
FIG. 12 illustrates another embodiment of IC capability reporting by a specified CQI value, with MAC layer based offloading.

FIG. 12 shows an embodiment of IC capability reporting by a specified CQI value, with MAC layer based offloading. After the serving NodeB receives this IC capability report, the serving NodeB directly determines that a UE should be offloaded to the LPN and can directly initiate a MAC layer handover procedure (e.g., any of the suitable MAC layer procedures described above) to offload this UE to the LPN.

In an embodiment, the RNC configures multiple $CIO_{LPN}$ parameters for a LPN. For a UE, the RCN evaluates the IC efficiency itself considering the IC capability and the current interference environment. Based on this IC efficiency evaluation results, the UE chooses one suitable $CIO_{LPN}$ as the parameter to trigger the measurement report/offloading request. To trigger reporting the information regarding IC capability, the RNC uses RRC signaling containing multiple $CIO_{LPN}$ parameters to ask the UE to report its IC capability. When the UE receives the RRC signaling, it starts to evaluate the current IC efficiency considering the IC capability and the current interference environment. Based on the evaluation results, the UE chooses one suitable $CIO_{LPN}$ for the corresponding LPN to perform handover event triggering. A larger $CIO_{LPN}$ parameter value is chosen when the current IC efficiency is higher.

With respect to the signaling for reporting the IC capability, the UE feeds back the chosen $CIO_{LPN}$ parameter as a reference $CIO_{LPN}$ parameter to the RNC. A new defined RRC signaling or IE can be used to convey the chosen $CIO_{LPN}$. Alternatively, the $CIO_{LPN}$ can be contained in the measurement report as a new defined IE. With respect to network offloading operation, the RNC extracts the information for the reference $CIO_{LPN}$. The RNC then verifies whether this reference $CIO_{LPN}$ is appropriately selected. If it is, the RNC configures this reference $CIO_{LPN}$ to the UE as the final parameter to perform handover event triggering. Otherwise, the RNC can reselect a more acceptable $CIO_{LPN}$ and assign it to the UE as the final parameter to perform handover event triggering. This verification by the RNC can ensure that the UE with higher IC efficiency has more priority to be offloaded to the LPN.

Figure 13:
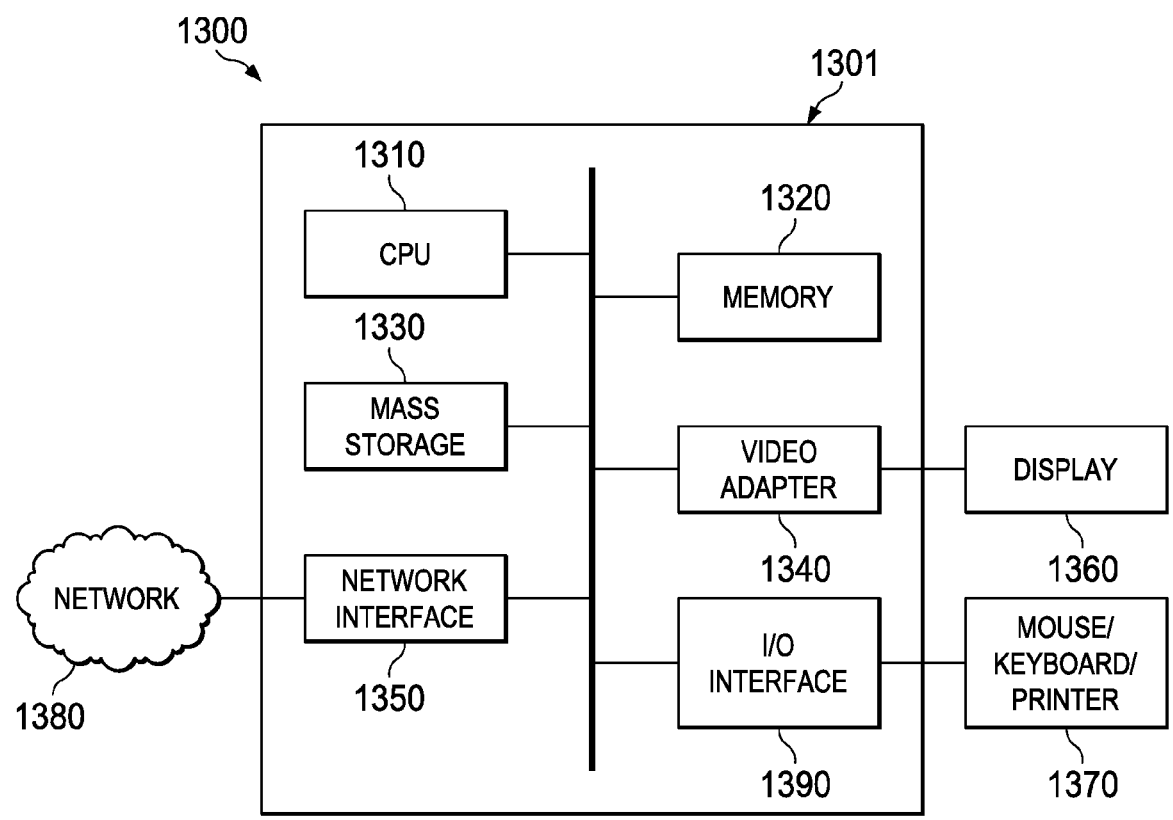
FIG. 13 is a diagram of a processing system that can be used to implement various embodiments.

FIG. 13 is a block diagram of a processing system 1300 that may be used for implementing the devices and methods disclosed herein, such as a UE, a macro NodeB, or a LPN.

Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 1300 may comprise a processing unit 1301 equipped with one or more input/output devices, such as a speaker, microphone, mouse, touchscreen, keypad, keyboard, printer, display, and the like. The processing unit 1301 may include a central processing unit (CPU) 1310, memory 1320, a mass storage device 1330, a video adapter 1340, and an I/O interface 1390 connected to a bus.

The bus may be one or more of any type of several bus architectures including a memory bus or memory controller, a peripheral bus, video bus, or the like. The CPU 1310 may comprise any type of electronic data processor. The memory 1320 may comprise any type of system memory such as static random access memory (SRAM), dynamic random access memory (DRAM), synchronous DRAM (SDRAM), read-only memory (ROM), a combination thereof, or the like. In an embodiment, the memory 1320 may include ROM for use at boot-up, and DRAM for program and data storage for use while executing programs.

The mass storage device 1330 may comprise any type of storage device configured to store data, programs, and other information and to make the data, programs, and other information accessible via the bus. The mass storage device 1330 may comprise, for example, one or more of a solid state drive, hard disk drive, a magnetic disk drive, an optical disk drive, or the like.

The video adapter 1340 and the I/O interface 1390 provide interfaces to couple external input and output devices to the processing unit 1301. As illustrated, examples of input and output devices include a display 1360 coupled to the video adapter 1340 and a combination of mouse/keyboard/printer 1370 coupled to the I/O interface 1390. Other devices may be coupled to the processing unit 1301, and additional or fewer interface cards may be utilized. For example, a serial interface such as Universal Serial Bus (USB) (not shown) may be used to provide an interface for a printer.

The processing unit 1301 also includes one or more network interfaces 1350, which may comprise wired links, such as an Ethernet cable or the like, and/or wireless links to access nodes or one or more networks 1380. The network interface 1350 allows the processing unit 1301 to communicate with remote units via the networks 1380. For example, the network interface 1350 may provide wireless communication via one or more transmitters/transmit antennas and one or more receivers/receive antennas. In an embodiment, the processing unit 1301 is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented by a user equipment (UE) for interference cancellation (IC) capability reporting, the method comprising:
   reporting, to a network, IC capability information of the UE in a defined information element (IE) including a value indicating a class of the UE from a plurality of classes for IC receivers;
   receiving, from the network, instructions in accordance with the IC capability information of the UE; and
   initiating a handover procedure in accordance with the instructions.

2. The method of claim 1, wherein reporting the IC capability information includes sending the IC capability information using radio resource control (RRC) signaling to a radio network controller (RNC) of the network.

3. The method of claim 2, wherein the RRC signaling comprises the defined IE for indicating the IC capability information.

4. The method of claim 3 further comprising setting a value in the defined IE to indicate a capability of the UE to perform receiver interference cancellation.

5. The method of claim 3 further comprising setting the value in the defined IE to indicate the class of the UE from the plurality of classes for IC receivers.

6. The method of claim 1, wherein the classes include a Type 3i receiver class, a second IC receiver class capable of reconstructing and cancelling a control channel signal from interference, a third IC receiver class capable of constructing and cancelling both control and data signals from interference, a fourth IC receiver class capable of cancelling a plurality of relatively stronger interference signals, a fifth IC receiver class capable of cancelling a plurality of interference signals, and further classes combining any one of the Type 3i receiver class, the second IC receiver class, and the third IC receiver class with any one of the fourth IC receiver class and the fifth IC receiver class.

7. The method of claim 1, wherein the classes include a first receiver class that does not require network assistance for IC, a second receiver class that requires partial information through network assistance for IC, and a third receiver class that requires complete information through network assistance for IC.

8. The method of claim 1, wherein the classes are defined according to one of required signal-to-interference-plus-noise ratios (SINRs) or required chip energy to noise power density ratio (Ec/No) for decoding data sizes with block error rate (BLER) targets.

9. The method of claim 2, wherein the method includes:
   receiving from the RNC a configuration for post-IC measurements;
   performing the post-IC measurements according to the configuration; and
   generating a report of the post-IC measurements, wherein the RRC signaling comprises the report of the post-IC measurements.

10. The method of claim 9 further comprising:
performing pre-IC measurements corresponding to the post-IC measurements; and
adding the pre-IC measurements in the report.

11. The method of claim 10, wherein the post-IC measurements comprise at least one of post-IC signal-to-interference-plus-noise ratio (SINR) quantities, post-IC channel quality indicator (CQI) quantities, and post-IC Ec/No quantities, and wherein the corresponding pre-IC measurements comprise at least one of pre-IC SINR quantities, pre-IC CQI quantities, and pre-IC Ec/No quantities.

12. The method of claim 9, wherein the handover procedure is initiated in accordance with an event triggering equation including the post-IC measurements.

13. The method of claim 9, wherein the report is a channel quality indicator (CQI) report.

14. The method of claim 1, wherein the instructions comprise radio resource control (RRC) signaling to the UE that triggers the handover procedure or assigns to the UE a higher priority for offloading from a first radio node serving the UE to a second radio node.

15. The method of claim 1, wherein reporting the IC capability information to the UE includes reporting a UE category defined according to IC capability of the UE.

16. A user equipment (UE) with interference cancellation (IC) capability reporting, the UE comprising:
at least one processor; and
a non-transitory computer readable storage medium storing programming for execution by the at least one processor, the programming including instructions to:
report, to a network, IC capability information of the UE in a defined information element (IE) including a value indicating a class of the UE from a plurality of classes for IC receivers;
receive, from the network, commands in accordance with the IC capability information of the UE; and
initiate a handover procedure in accordance with the commands.

17. The UE of claim 16, wherein the commands to report the IC capability information include commands to send the IC capability information via radio resource control (RRC) signaling to a radio network controller (RNC) of the network.

18. The UE of claim 16, wherein the commands comprise radio resource control (RRC) signaling to the UE that triggers the handover procedure or assigns to the UE a higher priority for offloading from a first radio node serving the UE to a second radio node.

19. A method implemented by a network component for supporting user equipment (UE) interference cancellation (IC) capability, the method comprising:
receiving, from a UE, IC capability information of the UE in a defined information element (IE) including a value indicating a class of the UE from a plurality of classes for IC receivers;
evaluating the IC capability information of the UE; and
sending, to the UE, commands in accordance with the IC capability information of the UE, the commands determining a handover behavior by the UE.

20. The method of claim 19, wherein the commands are one of commands triggering a handover procedure at the UE, assigning the UE a higher priority to be offloaded from a first radio node serving the UE to a second radio node, and assigning to the UE a larger cell individual offset (CIO) value for a target low power node (LPN).

21. The method of claim 19, wherein the commands are sent to the UE upon determining, according to the IC capability information, that the UE supports IC.

22. The method of claim 19, wherein the commands are commands assigning the UE a higher priority for offloading from a first radio node serving the UE to a second radio node in accordance with the class of the UE, and wherein the higher priority corresponds to a higher class of IC capability.

23. The method of claim 19, wherein the IC capability information is received in a channel quality indicator (CQI) report from the UE, and wherein the method further comprises sending a high speed-shared control channel (HS-SCCH) order to receive the CQI report form the UE.

24. The method of claim 19, wherein the evaluating includes determining whether to offload the UE from a first radio node serving the UE to a second radio node according to the IC capability information.

25. The method of claim 19, wherein the IC capability information includes a post-IC measurement, and wherein the evaluating includes determining whether to offload the UE from a first radio node serving the UE to a second radio node according to the post-IC measurement.

26. The method of claim 19, wherein the IC capability information includes a post-IC measurement, and wherein the evaluating includes determining an IC capability of the UE according to the post-IC measurement.

27. The method of claim 19, wherein the evaluating includes determining whether to trigger a handover procedure at the UE according to the IC capability information.

28. A network component for supporting user equipment (UE) interference cancellation (IC) capability, the network component comprising:
at least one processor; and
a non-transitory computer readable storage medium storing programming for execution by the at least one processor, the programming including instructions to:
receive, from a UE, IC capability information of the UE in a defined information element (IE) including a value indicating a class of the UE from a plurality of classes for IC receivers;
evaluate the IC capability information of the UE; and
send, to the UE, commands in accordance with the IC capability information of the UE, the commands determining a handover behavior by the UE.

29. The network component of claim 28, wherein the commands are one of inst-commands ructions triggering a handover procedure at the UE, assigning the UE a higher priority to be offloaded from a first radio node serving the UE to a second radio node, and assigning to the UE a larger cell individual offset (CIO) value for a target low power node (LPN).

30. The network component of claim 28, wherein the commands are commands assigning the UE a higher priority for offloading from a first radio node serving the UE to a second radio node in accordance with the class of the UE, and wherein the higher priority corresponds to a higher class of IC capability.

* * * * *